US012644414B1

(12) United States Patent
Kippel et al.

(10) Patent No.: US 12,644,414 B1
(45) Date of Patent: Jun. 2, 2026

(54) SYSTEM AND METHOD FOR EXHAUST GAS TEMPERATURE CONTROL

(71) Applicant: GE Infrastructure Technology LLC, Greenville, SC (US)

(72) Inventors: Bradly Aaron Kippel, Greenville, SC (US); John Alexander Petzen, III, Roanoke, VA (US)

(73) Assignee: GE Vernova Infrastructure Technology LLC, Greenville, SC (US)

( * ) Notice: Subject to any disclaimer, the term of this patent is extended or adjusted under 35 U.S.C. 154(b) by 0 days.

(21) Appl. No.: 19/051,070

(22) Filed: Feb. 11, 2025

(51) Int. Cl.
F02C 7/18 (2006.01)

(52) U.S. Cl.
CPC ..................................... F02C 7/18 (2013.01)

(58) Field of Classification Search
CPC .......... F01D 21/12; F01D 25/305; F02C 7/14; F02C 7/18; F05D 2270/0831; F05D 2270/112; F05D 2270/3032
See application file for complete search history.

(56) References Cited

U.S. PATENT DOCUMENTS

| | | | | |
|---|---|---|---|---|
| 7,862,771 | B2 * | 1/2011 | Boyden | G05B 13/048 |
| | | | | 422/177 |
| 8,034,291 | B2 * | 10/2011 | Qi | F01N 3/208 |
| | | | | 422/62 |

| | | | | |
|---|---|---|---|---|
| 8,755,941 | B2 * | 6/2014 | Swanson | F01D 25/30 |
| | | | | 700/32 |
| 9,677,433 | B2 * | 6/2017 | Moetakef | F01L 1/344 |
| 10,139,842 | B2 * | 11/2018 | Cho | G05B 15/02 |
| 2012/0031106 | A1 * | 2/2012 | Chillar | F01D 17/085 |
| | | | | 60/783 |
| 2015/0267591 | A1 * | 9/2015 | Miller | G01K 13/02 |
| | | | | 60/276 |
| 2017/0204786 | A1 * | 7/2017 | Zhang | F01D 25/305 |
| 2017/0350320 | A1 * | 12/2017 | Kippel | F01D 25/12 |

* cited by examiner

*Primary Examiner* — Scott J Walthour
(74) *Attorney, Agent, or Firm* — Fletcher Yoder, P.C.

(57) ABSTRACT

A gas turbine system includes a gas turbine engine and a gas treatment system for treating an exhaust gas, and a thermal control system to control temperatures of the exhaust gas such that the temperatures may be suitable for the gas treatment system. The thermal control system may include a tempering air control and a sensor grid control, which may cooperatively control a tempering air that may be injected into the exhaust gas. Specifically, the thermal control system may adjust the flow of tempering air by compensating for a failed sensor in a sensor grid system, using a worst case scenario assumption, to protect the gas treatment system from overheating and to allow for continuous operations of the gas turbine system without interruptions due to sensor failures.

21 Claims, 8 Drawing Sheets

SYSTEM AND METHOD FOR EXHAUST GAS TEMPERATURE CONTROL

TECHNICAL FIELD

The subject matter disclosed herein relates to gas turbine systems and, more specifically, to thermal control within various components of the gas turbine system.

BACKGROUND

Gas turbine systems typically include at least one gas turbine engine having a compressor, a combustor, and a turbine. The combustor is configured to combust a mixture of fuel and compressed air to generate hot combustion gases, which, in turn, drive blades of the turbine. Exhaust gas produced by the gas turbine engine may include undesirable emissions, such as nitrogen oxides ($NO_x$), sulfur oxides ($SO_x$), carbon oxides ($CO_x$), and unburned hydrocarbons, which are reduced in a gas treatment system. Unfortunately, the gas treatment system may not operate effectively due to a malfunction or failure of one or more sensors. Accordingly, a need exists for a control system that accounts for the malfunction or failure of the one or more sensors.

BRIEF DESCRIPTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In summary, the present disclosure provides a gas turbine system that includes a gas turbine engine and a gas treatment system for treating an exhaust gas; and a thermal control system to control temperatures of the exhaust gas such that the temperatures may be suitable for the gas treatment system. The thermal control system may include a tempering air control and a sensor grid control, which may cooperatively control a tempering air that may be injected into the exhaust gas. Specifically, the thermal control system may adjust the flow of tempering air by compensating for a failed sensor in a sensor grid system, using a worst case scenario assumption, to protect the gas treatment system from overheating and to allow for continuous operations of the gas turbine system without interruptions due to sensor failures.

In certain embodiments, a system may include an exhaust duct, a gas treatment system coupled to the exhaust duct, a sensor grid having a plurality of sensors disposed in the exhaust duct, and a tempering air injection system coupled to the exhaust duct upstream from the gas treatment system, where the tempering air injection system is configured to inject an air flow into an exhaust flow in the exhaust duct. The system further comprises a controller having a memory, a processor, and instructions stored on the memory and executable by the processor to obtain sensor feedback of temperature via the plurality of sensors in the sensor grid. If a sensor failure occurs in the plurality of sensors, the processor may establish an error between a computer model and the sensor grid for an average value and a maximum value of the temperature compensating for a worst case scenario of the sensor failure, and subtract the error from operating limits of the gas treatment system and set target average value and target maximum value of the temperature.

Further, the processor may control the air flow from the tempering air injection system into the exhaust flow in the exhaust duct based on the target average value and the target maximum value of the temperature and temperature measurements from the sensor grid.

In certain embodiments, a system may include a controller having a memory, a processor, and instructions stored on the memory and executable by the processor to obtain sensor feedback of temperature via a plurality of sensors in a sensor grid disposed in an exhaust duct, where a gas treatment system is coupled to the exhaust duct, and a tempering air injection system is coupled to the exhaust duct upstream from the gas treatment system and configured to inject an air flow into an exhaust flow in the exhaust duct. If a sensor failure occurs in the plurality of sensors, the processor may establish an error between a computer model and the sensor grid for an average value and a maximum value of the temperature compensating for a worst case scenario of the sensor failure, and subtract the error from operating limits of the gas treatment system and set target average value and target maximum value of the temperature. Further, the processor may control the air flow from the tempering air injection system into the exhaust flow in the exhaust duct based on the target average value and the target maximum value of the temperature and temperature measurements from the sensor grid.

In certain embodiments, a method may include obtaining sensor feedback of temperature via a plurality of sensors in a sensor grid disposed in an exhaust duct, where a gas treatment system is coupled to the exhaust duct, and a tempering air injection system is coupled to the exhaust duct upstream from the gas treatment system and configured to inject an air flow into an exhaust flow in the exhaust duct. If a sensor failure occurs in the plurality of sensors, the method may additionally include establishing an error between a computer model and the sensor grid for an average value and a maximum value of the temperature compensating for a worst case scenario of the sensor failure, and subtracting the error from operating limits of the gas treatment system and setting target average value and target maximum value of the temperature. Further, the method may include controlling the air flow from the tempering air injection system into the exhaust flow in the exhaust duct based on the target average value and the target maximum value of the temperature and temperature measurements from the sensor grid.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
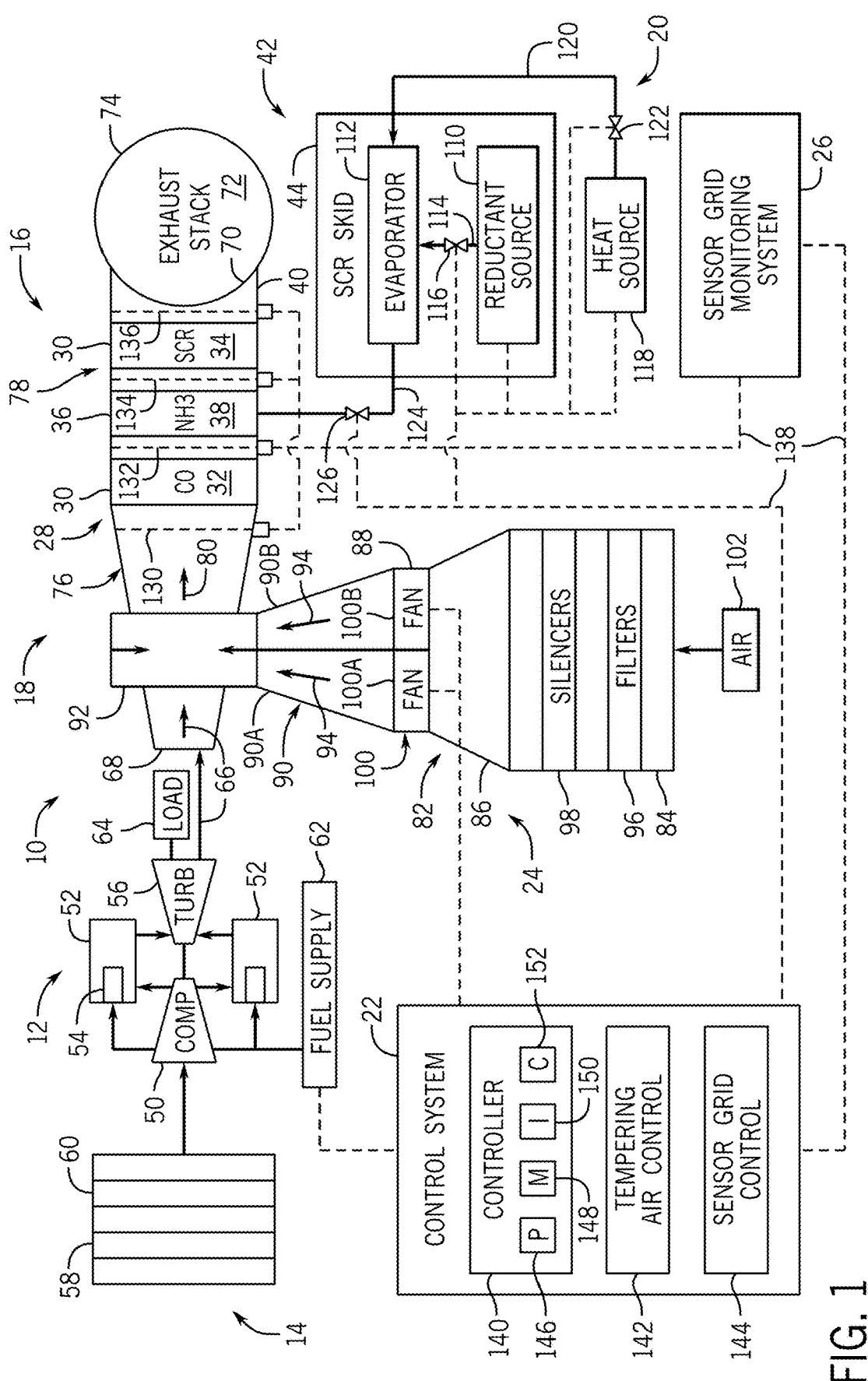
FIG. 1 is a block diagram of an embodiment of a gas turbine system including a thermal control system for monitoring and controlling temperatures in an exhaust system.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements.

Embodiments disclosed herein generally relate to techniques for monitoring and controlling temperature of an exhaust gas flow through an exhaust system having a gas treatment system for emissions reduction in a gas turbine system. For example, the gas treatment system may reduce undesirable gases via one or more gas treatment units, such as catalyst units, reductant injection units, or a combination thereof. The undesirable gases may include nitrogen oxides ($NO_x$), sulfur oxides ($SO_x$), carbon oxides ($CO_x$), and unburned hydrocarbons. A tempering air injection system may be coupled to the exhaust system upstream of the gas treatment system, wherein the tempering air injection system supplies a tempering air into the exhaust gas flow for temperature control of the exhaust gas flow passing through the gas treatment units.

One technique for removing or reducing the amount of $NO_x$ in an exhaust gas flow is by Selective Catalytic Reduction (SCR). In an SCR process, a reductant, such as ammonia ($NH_3$), is injected into the exhaust gas flow and reacts with the $NO_x$ in the exhaust gas in the presence of a catalyst to produce nitrogen ($N_2$) and water ($H_2O$). The effectiveness of the SCR process may be at least partially dependent upon the temperature of the exhaust gas, and the particular catalyst used by the SCR system may determine an optimal temperature range for the exhaust gas to remove NOx and to extend the life of the catalyst. By way of non-limiting example, the SCR process for removing NOx may be particularly effective at temperatures of approximately 500 to 900 degrees Fahrenheit (° F.) (e.g., approximately 260 to 482 degrees Celsius (° C.)). An exhaust gas flow with unknown temperatures entering the SCR system risks deterioration or permanent damage of the SCR system (e.g., SCR catalyst over-temperature), causing the gas turbine systems to potentially trip or run back. Thus, it may be advantageous to monitor and control the temperature of the exhaust gas flow entering the SCR, such that the temperature is within the effective temperature range for SCR to increase the effectiveness of the SCR process (e.g., removal of $NO_x$). Accordingly, the gas turbine systems may be configured to monitor the temperature of the exhaust gas flow upstream, at, and/or downstream of the SCR system and use tempering air (e.g., ambient air) to cool the exhaust gas flow when the temperature of the exhaust gas flow is higher than the effective temperature range for SCR. The gas turbine systems may be further configured to determine an amount of tempering air to be injected into the exhaust gas flow based on the temperature of the exhaust gas flow to effectively cool the exhaust gas flow.

Accordingly, certain gas turbine systems may be configured to measure the temperature of the exhaust gas flow with one or more sensor grids (e.g., temperature sensors arranged in a grid) at one or more locations along an exhaust flow path through the exhaust duct. Each sensor grid uses a spaced arrangement of sensors to monitor a temperature distribution across the exhaust duct, wherein the sensor grid may measure temperatures indicating certain areas with higher and lower temperatures. Additionally, the gas turbine systems may be configured to determine an amount of tempering air to be injected into the exhaust gas flow using a computational model of the gas turbine systems.

However, a temperature sensor may fail (e.g., unreliable and/or failed state) during operation, causing underregulated exhaust gas flow entering the SCR system. For example, when a temperature sensor at a hottest region of the exhaust gas flow fails (e.g., unreliable and/or failed state), the turbine control model may instruct to inject an insufficient amount of the tempering air based on an incomplete temperature distribution indicative of an average temperature lower than the actual average temperature of the exhaust gas flow. As a result, the exhaust gas flow may be insufficiently cooled, causing the SCR catalyst to exceed an upper temperature threshold, risking damage to the SCR system. Hence, conventionally, a failure of one or more temperature sensors, particularly in critical locations, can result in an alarm, a trip, and/or a turbine run back (e.g., sudden decrease in power output) in order to protect the SCR catalyst from being overheated. However, such interruptions of the operation increase the operating cost and decrease the operating efficiency of the gas turbine systems. Alternatively, the gas turbine systems may be configured to include an increased number of temperature sensors in an attempt to reduce the effect of temperature sensor failures. However, such approach is also costly.

Therefore, a system and/or a method that can effectively monitor and control the temperature of the exhaust gas flow to protect the SCR catalyst even when one or more of the temperature sensors fail (e.g., unreliable and/or failed state) may be desirable. In certain embodiments, a gas turbine system, such as a simple cycle heavy-duty gas turbine system, may have a thermal control system including a sensor grid control configured to compensate for one or more failed temperature sensors and to determine an amount of tempering air to be injected into the exhaust gas flow. The sensor grid control may be configured to compensate for each failed sensor by assuming a worst case scenario (e.g., most critical sensor position or operating point), regardless of the actual sensor position in the sensor grids. Using this sensor grid control, the gas turbine system may continue its operation without interruptions even when one or more of the temperature sensors fail, thereby increasing the efficiency of the gas turbine system. Further, while the presently disclosed techniques may be particularly useful in simple cycle heavy-duty gas turbine systems, as will be discussed below, it should be understood that the present technique may be implemented in any suitably configured system, including combined cycle gas turbine systems, for example.

FIG. 1 is a schematic of an embodiment of a gas turbine system 10 having a gas turbine engine 12, an intake system 14, and an exhaust system 16, wherein the exhaust system 16 includes a thermal control system 18 and a gas treatment system 20. The thermal control system 18 includes a control system 22, a tempering air injection system 24, a sensor grid monitoring system 26, and a sensor grid system 28. The thermal control system 18 is configured to monitor and control temperatures in the exhaust system 16 in cooperation with the gas treatment system 20. In particular, the thermal control system 18 is configured to adjust (e.g., compensate or correct) for any failed sensors in the sensor grid system 28, such that the tempering air injection system 24 provides sufficient tempering air to achieve suitable temperatures for the gas treatment system 20. The gas treatment system 20 may include one or more catalyst units 30 (e.g., catalyst units 32 and 34) and one or more reductant injection units 36 (e.g., selective catalytic reduction (SCR) unit 38) in an exhaust duct 40, wherein the reductant injection units 36 (e.g., SCR unit 38) are coupled to a reductant supply system 42 (e.g., a SCR skid 44). Thus, the thermal control system 18 helps control the temperature for improved operation of the catalyst units 30 and the reductant injection units 36. Various aspects of the thermal control system 18 and the gas treatment system 20 are discussed in further detail below after discussing the gas turbine engine 12.

The gas turbine engine 12 includes a compressor 50, one or more combustors 52 having fuel nozzles 54, and a turbine 56 (i.e., an expansion turbine). The compressor 50 receives air from the intake system 14, which includes air filters 58 and silencers 60. The compressor 50 compresses the air in one or more compressor stages and discharges compressed air to the combustors 52. The combustors 52 receive the compressed air from the intake system 14 and fuel from a fuel supply 62, and then combust a mixture of the compressed air and fuel in a combustion chamber to generate hot combustion gases. The hot combustion gases flow into the turbine 56, thereby driving one or more turbine stages. The turbine 56 drives the compressor 50 and a load 64 (e.g., electrical generator) via one or more shafts. The turbine 56 also discharges an exhaust gas 66, which then flows through the exhaust duct 40 of the exhaust system 16.

The exhaust system 16 includes the exhaust duct 40, which may include an exhaust inlet 68 and an exhaust outlet 70 coupled to an exhaust stack 72. The exhaust duct 40 may extend generally horizontally between the exhaust inlet 68 and the exhaust outlet 70, whereas the exhaust stack 72 may extend generally vertically from the exhaust duct 40 to an exhaust stack outlet 74. The exhaust duct 40 may include a first duct portion 76 coupled to the tempering air injection system 24 and a second duct portion 78 coupled to and/or housing the gas treatment system 20. In certain embodiments, the first duct portion 76 may be a variable geometry duct portion (e.g., a diverging or expanding duct portion) that expands in cross-sectional area in an exhaust flow direction 80 from the exhaust inlet 68 to the second duct portion 78. The second duct portion 78 may be a constant or variable geometry duct portion from the first duct portion 76 to the exhaust outlet 70. However, the exhaust duct 40 may have a variety of constant or variable duct portions associated with the tempering air injection system 24 and the gas treatment system 20.

The tempering air injection system 24 may include an air injection duct 82 coupled to the first duct portion 76 of the exhaust duct 40. In the illustrated embodiment, the air injection duct 82 includes an intake duct portion 84 coupled to duct portions 86, 88, 90, and 92. The duct portions 86 and 90 may include variable geometry duct portions (e.g., converging duct portions) that decrease in cross-sectional area in an air flow direction 94 toward the exhaust duct 40. The duct portions 84 and 88 may include constant or variable geometry duct portions.

As illustrated, the air intake duct portion 84 includes one or more air filters 96 and silencers 98, while the duct portion 88 includes one or more fans 100 (e.g., fans 100A and 100B). The fans 100 may be electric fans or blowers having a plurality of blades coupled to an electric motor. In certain embodiments, the tempering air injection system 24 may include 1, 2, 3, 4, 5, 6, or more fans 100, which may be operated independently or together with one another to provide a desired tempering airflow into the exhaust duct 40. In certain embodiments, the fans 100 may be coupled to separate duct portions of the air injection duct 82 leading to the exhaust duct 40. For example, the fan 100A may be disposed in a duct portion 90A and the fan 100B may be disposed in a duct portion 90B, each independently coupled to the duct portion 92. Thus, the fans 100 (e.g., 100A and 100B) may be operated to force air 102 (e.g., a tempering air flow) to flow through the intake duct portion 84 to the duct portion 92, which then injects the air 102 into the exhaust gas 66 flowing through the exhaust duct 40.

The duct portion 92 may extend partially or completely around the first duct portion 76 of the exhaust duct 40 and direct the air 102 radially inward into the exhaust duct 40 via one or more radial openings in the exhaust duct 40. For example, the duct portion 92 may direct the air 102 radially into the first duct portion 76 of the exhaust duct 40 from a top side, opposite lateral sides (e.g., left and right sides), and/or a bottom side of the exhaust duct 40.

In certain embodiments, the tempering air injection system 24 may operate one or more of the fans 100 alone, in combination at the same speed, in combination at different speed, or any combination thereof. As an alternative to modulating the fan speed, guide vanes or dampers may be used to modify the flow out of the tempering air fans 100. Depending on the fans 100 being operated and the speed (or the fan guide vane or damper position), the air 102 flow injected into the exhaust gas 66 may vary the temperature distribution and the average temperature in exhaust duct 40. Thus, the control system 22 may be configured to operate the fans 100 to provide a suitable temperature distribution and average temperature in the exhaust duct 40 based on a desired temperature distribution and a desired average temperature for the catalyst units 30 (e.g., catalyst units 32 and 34) and the reductant injection units 36 (e.g., SCR units 38).

The catalyst units 30 (e.g., catalyst units 32 and 34) and the reductant injection units 36 are disposed in the second duct portion 78 of the exhaust duct 40 downstream from the tempering air injection system 24. In certain embodiments, the catalyst unit 32 includes a carbon monoxide (CO)

catalyst unit, the catalyst unit 34 includes a SCR catalyst unit, and the reductant injection unit 36 includes the SCR unit 38 (e.g., ammonia injection unit). The reductant injection unit 36 may include a plurality of injection nozzles or openings disposed in one or more two-dimensional injection grids across the exhaust duct 40. In some embodiments, the catalyst units 30 (e.g., catalyst units 32 and 34) may be combined with one another (e.g., combined CO, SCR catalyst unit).

The reductant injection unit 36 is coupled to the reductant supply system 42, which includes the SCR skid 44 having a reductant source 110 (e.g., ammonia source) and an evaporator 112. The reductant source 110 may include a tank, a pump, a flow meter, or any combination thereof, configured to supply a reductant (e.g., ammonia) to the evaporator 112. The reductant source 110 is coupled to the evaporator 112 via a conduit 114 having a valve 116 controlled by the control system 22 to control a flow of the reductant to the evaporator 112. The evaporator 112 is coupled to a heat source 118, such as a heat exchanger, an electric heater, a combustion heater, exhaust gas recirculation, or any combination thereof. In the illustrated embodiment, the heat source 118 is coupled to the evaporator 112 via a conduit 120 having a valve 122 controlled by the control system 22 to control a flow of heated fluid to the evaporator 112. The heated fluid from the heat source 118 is configured to transfer heat to the reductant (e.g., ammonia) in the evaporator 112, thereby evaporating the reductant for injection into the exhaust duct 40 via the reductant injection unit 36 (e.g., SCR unit 38). In the illustrated embodiment, the evaporator 112 is coupled to the reductant injection unit 36 via one or more conduits 124 having respective valves 126 controlled by the control system 22 to control the amount of reductant injection into the exhaust duct 40.

The sensor grid monitoring system 26 is coupled to the sensor grid system 28 at one or more locations at, upstream from, downstream from, and/or between the duct portion 92 of the tempering air injection system 24, the catalyst unit 32 (e.g., CO catalyst unit), the reductant injection unit 36, and the catalyst unit 34 (e.g., SCR catalyst unit). For example, the sensor grid system 28 may include sensor grids 130, 132, 134, and 136, each having a two-dimensional (2D) grid of sensors spaced apart from one another across the exhaust duct 40. In certain embodiments, the sensor grids 130, 132, 134, and 136 include temperature sensors (e.g., thermocouples) configured to monitor the temperature of the exhaust gas 66. The sensor grids 130, 132, 134, and 136 may have a uniform spacing of sensors (FIG. 3) and/or a variable spacing of sensors (FIGS. 4-7). For example, in a variable spacing, the sensors may be spaced more closely together in areas of particular interest (e.g., expected hot spots, central areas, etc.) for efficient operation of the catalyst units 32 and 34 and the reductant injection unit 36. In areas other than the areas of particular interest, the sensors may be arranged with uniform spacing.

In the illustrated embodiment, the sensor grid 130 is disposed upstream (e.g., immediately upstream) of the catalyst unit 32, the sensor grid 132 is disposed upstream (e.g., immediately upstream) of the reductant injection unit 36, the sensor grid 134 is disposed upstream (e.g., immediately upstream) of the catalyst unit 34, and the sensor grid 136 is disposed downstream (e.g., immediately downstream) of the catalyst unit 34. In certain embodiments, in the foregoing example, the sensor grids 130, 132, 134, and 136 may be spaced less than or equal to 0.1, 0.2, 0.3, 0.4, 0.5, 0.6, 0.7, 0.8, 0.9, or 1 meter from the respective catalyst units 32 and 34 and the reductant injection unit 36. However, the sensor grids 130, 132, 134, and 136 may be disposed at any suitable locations to help monitor a temperature distribution and average temperature of the exhaust gas 66 traveling through the catalyst units 32 and 34 and the reductant injection unit 36. The sensor grids 130, 132, 134, and 136 are electrically and/or communicatively coupled to the sensor grid monitoring system 26 and the control system 22 via a communications network and/or circuit 138.

The control system 22 is configured to monitor sensor feedback from the sensor grid system 28 (e.g., sensor grids 130, 132, 134, and 136) via the sensor grid monitoring system 26, and then control the tempering air injection system 24 and the gas treatment system 20 based on the monitored sensor feedback (e.g., temperature distribution and average temperature at one or more locations). In the illustrated embodiment, the control system 22 includes a controller 140, a tempering air control 142, and a sensor grid control 144. The controller 140 may include one or more processors 146, memory 148, instructions 150 stored on the memory 148 and executable by the processors 146, and communication circuitry 152 to communicate with the gas turbine engine 12, the tempering air injection system 24, the sensor grid monitoring system 26, and the gas treatment system 20.

The controller 140 is configured to control the tempering air injection system 24 via the tempering air control 142, which may include control logic executable via the instructions 150 to control the tempering air injection of the air 102 into the exhaust duct 40. For example, the controller 140 may be configured to control the fans 100 (e.g., 100A and 100B) of the tempering air injection system 24 to vary (e.g., increase or decrease) the overall flow rate of the air 102 and/or the distribution of the air 102 being injected into the first duct portion 76 of the exhaust duct 40 based on sensor feedback from the sensor grids 130, 132, 134, and/or 136. If the sensor grids 130, 132, 134, and/or 136 indicate an average temperature of the exhaust gas 66 is below a lower temperature threshold, then the controller 140 may be configured to control the fans 100 (e.g., 100A and 100B) to decrease the overall flow rate of the air 102 into the exhaust duct 40. On the other hand, if the sensor grids 130, 132, 134, and/or 136 indicate an average temperature of the exhaust gas 66 is above an upper temperature threshold, then the controller 140 may be configured to control the fans 100 (e.g., 100A and 100B) to increase the overall flow rate of the air 102 into the exhaust duct 40. Similarly, if the temperature distribution varies above some minimal variance threshold, then the controller 140 may be configured to vary operation of the fans 100 (e.g., 100A and 100B) in an attempt to decrease the overall temperature variance in the exhaust duct 40. Furthermore, if one or more sensors in the sensor grids 130, 132, 134, and/or 136 fails to operate properly (e.g., unreliable or failed state), then the controller 140 may be configured to compensate for the failed state of the one or more sensors via the sensor grid control 144.

Accordingly, the controller 140 is configured to monitor and control the sensor grid monitoring system 26 and the sensor grid system 28 (e.g., sensor grid 130, 132, 134, and 136) via the sensor grid control 144, which may include control logic executable via the instructions 150 to control use of the sensors in the sensor grids 130, 132, 134, and 136. For example, the sensor grid control 144 may be configured to analyze and compare one or more computer models and temperature feedback from sensors in the sensors grids 130, 132, 134, and 136 to establish an error between the computer models and the temperature feedback for an average temperature and a maximum temperature for the exhaust gas 66 at the location of each of the sensor grids 130, 132, 134, and 136. In some embodiments, the sensor grid system 28 (e.g., sensor grid 130, 132, 134, and 136) may be coupled to the controller 140. The sensor grid control 144 may be further configured to subtract the error from operational limits (e.g., temperature limits, such as set by manufacturers) of one or more of the catalyst units 30 (e.g., catalyst units 32 and/or 34) to obtain setpoints for an average temperature and a maximum temperature of the exhaust gas 66 at the location of each of the sensor grids 130, 132, 134, and 136. For example, the sensor grids (e.g., 130, 132, 134, and 136) immediately upstream and/or downstream relative to a particular catalyst unit 30 may be used when comparing the computer models and the temperature feedback, establishing the error, and obtaining the setpoints. In certain embodiments, the sensor grid control 144 may specifically analyze the computer models versus sensor feedback for the catalyst unit 34 (e.g., SCR catalyst unit) when establishing the error and obtaining the setpoints. The computer models may be stored in memory 148 or may be stored remotely from the controller 140 in a location or system accessible by processor 146.

In operation, the controller 140 may monitor the sensor feedback (e.g., temperature feedback) from the one or more sensor grids 130, 132, 134, and/or 136, compare the sensor feedback against the setpoints (e.g., average and maximum temperatures), and control the tempering air injection system 24 to control (e.g., increase or decrease) the temperature of the exhaust gas 66 to be suitable for the catalyst units 30 (e.g., catalyst units 32 and 34) and the reductant injection unit 36. In particular, the controller 140 is configured to control the speed of the fans (or the position of the fan guide vane or damper) 100 (e.g., 100A and 100B) to adjust (e.g., increase or decrease) the flow of air 102 into the exhaust duct 40, thereby adjusting the temperature of the exhaust gas 66. Unfortunately, if one or more of the sensors in the sensor grids 130, 132, 134, and/or 136 fails (e.g., unreliable and/or failed state), then the controller 140 may not be able to accurately control the temperature of the exhaust gas 66 to be suitable for the catalyst units 30 (e.g., catalyst units 32 and 34) and the reductant injection unit 36.

In certain embodiments, the controller 140 may be configured to compensate for the failed state of the one or more sensors via the sensor grid control 144. For example, the sensor grid control 144 may compensate for each failed sensor by establishing a new error between the computer models and the temperature feedback for an average temperature and a maximum temperature for the exhaust gas 66 at the location of each of the sensor grids 130, 132, 134, and 136. In certain embodiments, the sensor grid control 144 is configured to compensate for each failed sensor by assuming a worst case scenario (e.g., most critical sensor position or operating point), regardless of the actual sensor position in the sensor grids 130, 132, 134, and 136. For example, the worst case scenario may correspond to a hottest spot across the exhaust duct 40 where a sensor would typically sense a hottest temperature. If additional sensors fail, then the sensor grid control 144 would assume the next worst case scenario for each successive sensor failure, and establish a new error and new setpoints with the additional assumed worst case scenario(s). Thus, as the number of sensor failures increases, the sensor grid control 144 would progressively increase the amount of compensation in the tempering air flow provided by the tempering air injection system 24 into the exhaust duct 40 to ensure that the temperature of the exhaust gas 66 remains compatible with operational limits of the catalyst units 30 (e.g., catalyst units 32 and 34) and the reductant injection unit 36.

In addition to the compensation in control of the tempering air injection system 24, the sensor grid control 144 may output various alerts, alarms, and control actions to protect the gas turbine system 10. For example, if the number of sensor failures exceeds a first limit, then the sensor grid control 144 may output an alert or service recommendation via a computer display (e.g., recommending a planned future service of the sensor grids 130, 132, 134, and/or 136). If the number of sensor failures exceeds a second limit greater than the first limit, then the sensor grid control 144 may output an alarm via a computer display (e.g., recommending immediate service of the sensor grids 130, 132, 134, and/or 136). If the number of sensor failures exceeds a third limit greater than the second limit, then the sensor grid control 144 may output a control message and a control action to protect the gas turbine system 10, the gas treatment system 20, or a combination thereof. Various aspects of the sensor grid control 144 are discussed in further detail below.

Figure 2:
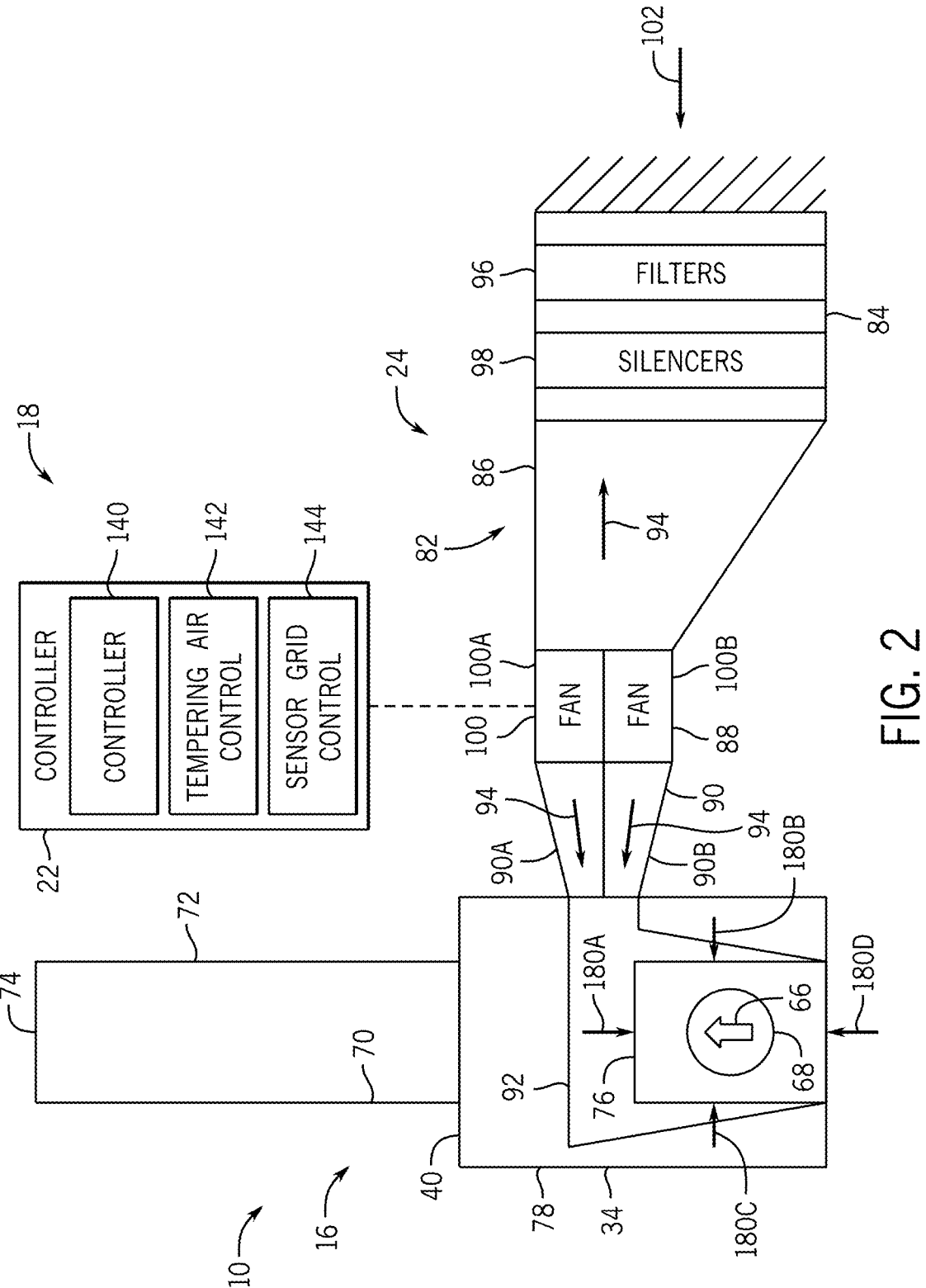
FIG. 2 is a schematic side view of an embodiment of the gas turbine system of FIG. 1, further illustrating a tempering air injection system coupled to an exhaust duct of the exhaust system.

FIG. 2 is a schematic side view of an embodiment of the gas turbine system 10 of FIG. 1, illustrating the tempering air injection system 24 coupled to the exhaust system 16. The gas turbine system 10 is substantially the same as discussed above with reference to FIG. 1. For example, the tempering air injection system 24 and the exhaust system 16 have the same components and functionality as described above with reference to FIG. 1. Therefore, like elements are shown with like numbers.

As previously discussed with reference to FIG. 1, the gas turbine system 10 includes the thermal control system 18 having the tempering air injection system 24 coupled to the exhaust system 16 to control the temperature of the exhaust gas flow. Specifically, the duct portion 92 of the air injection duct 82 of the tempering air injection system 24 is coupled to the first duct portion 76 of the exhaust duct 40 of the exhaust system 16. As such, the air 102 flowing through the air injection duct 82 of the tempering air injection system 24, which generally has a relatively lower temperature, is injected into the exhaust gas 66 flowing through the exhaust duct 40 of the exhaust system 16, which generally has a relatively higher temperature, thereby adjusting the temperature of the exhaust gas 66 to a suitable level for the one or more catalyst units 30 (e.g., CO catalyst unit 32 and SCR catalyst unit 34) and the one or more reductant injection units 36 (e.g., SCR unit 38).

Although the illustrated embodiment shows that the tempering air injection system 24 only includes a single air injection duct 82 disposed on the right side of the exhaust system 16, the tempering air injection system 24 may include one or more air injection ducts coupled to the exhaust system 16 in any suitable arrangement. In some embodiments, the air injection duct 82 may include an additional air injection duct disposed on the left side of the exhaust system 16, such that the air 102 may be injected into the exhaust gas 66 from one or more air injection ducts.

Further, the air injection duct 82 may be configured to inject the air 102 in one or more specific directions. For example, the duct portion 92 may be configured to direct the air 102 radially into the first duct portion 76 of the exhaust duct 40 from a top side in a direction 180A, opposite lateral sides (e.g., left and right sides) in directions 180B and 180C, and/or a bottom side of the exhaust duct 40 in a direction 180D. In some embodiments, the air injection duct 82 may block or permit the air 102 flowing therethrough to the exhaust duct 40. For example, the air injection duct 82 may include a valve (e.g., damper) controlled by a controller (e.g., the tempering air control 142). As such, the air injection duct 82 may block or permit the air 102 flowing therethrough to the exhaust duct 40 by controlling a position (e.g., opening or closing) of the valve. In some embodiments, the air injection duct 82 may include one or more air injection ducts, where the one or more air injection ducts may have one or more respective valves in one or more respective positions. As such, by having different combinations of valve positions, the tempering air injection system 24 may inject the air 102 in a controlled pattern. For example, the tempering air injection system 24 may inject the air 102 from a certain air injection duct configured to direct air in a certain direction (e.g., 180A, 180B, 180C, 180D, or a combination thereof) to lower a hot spot of the exhaust gas 66 located within a certain region of the exhaust duct 40. In addition, as previously discussed with reference to FIG. 1, the tempering air injection system 24 may control the injection of air 102 further by adjusting the respective speeds of the fans (or position of the fan guide vanes or dampers) 100 (e.g., fans 100A and 100B) via the control system 22 (e.g., the controller 140, the tempering air control 142).

Therefore, the tempering air injection system 24 is configured to allow the air 102 to be injected in a range of air injection configurations. In certain embodiments, the control system 22 (e.g., the tempering air control 142) may determine a suitable injection configuration further based on a measured temperature distribution and/or other measured temperature characteristics (e.g., a measured average temperature, a measured maximum temperature, a measured minimum temperature, a measured temperature variance) indicated by sensor feedback provided by the sensor grid system 28 (e.g., sensor grids 130, 132, 134, and/or 136). In such embodiments, the control system 22 (e.g., the tempering air control 142) may determine the suitable injection configuration based on a desired temperature distribution and/or other desired temperature characteristics (e.g., a desired average temperature, a desired maximum temperature, a desired minimum temperature, a desired temperature variance) for the catalyst units 30 (e.g., catalyst units 32 and 34) and the reductant injection units 36 (e.g., SCR units 38). The control system 22 (e.g., the tempering air control 142) may accordingly instruct controlled devices of the tempering air injection system 24 (e.g., valves and fans 100) to inject the air 102 in the suitable injection configuration, such that the measured temperature distribution and/or other the measured temperature characteristics may better match with the desired temperature distribution and/or the other desired temperature characteristics. For example, the control system 22 (e.g., the tempering air control 142) may determine an injection configuration to reduce a measured variance of the temperature distribution of the exhaust gas 66 below a desired maximum variance threshold and generate corresponding instructions to provide a position (e.g., opening or closing) for each valve and a speed for each fan 100 (or position of the fan guide vanes or damper).

As previously discussed in reference to FIG. 1, the sensor grid system may obtain sensor feedback of temperatures of the exhaust gas 66 at any suitable locations within the exhaust duct 40, where the sensor grid system 28 includes a sensor grid (e.g., sensor grid 130, 132, 134, or 136). The sensor grid of the sensor grid system 28 may have a two-dimensional grid of sensors spaced apart from one another across the exhaust duct 40. As such, the sensor grid may obtain sensor feedback of temperature of the exhaust gas at various sensor positions across the sensor grid. The sensor grid (e.g., sensor grid 130, 132, 134, or 136) may have a uniform spacing of sensors and/or a variable spacing of sensors.

FIGS. 3-7 are schematic views of the sensor grid system 28 disposed in the exhaust duct 40 of FIGS. 1 and 2, illustrating a temperature map 190 (e.g., temperature contour map) and a sensor grid 192 (e.g., two-dimensional sensor grid) in a plane 194 across the exhaust duct 40. The sensor grid 192 includes a plurality of sensors 196 (e.g., temperature sensors, represented with filled circles and numbers) spaced apart from one another in the plane 194. The sensor grid 192 is configured to measure the temperature across the plane 194 of the exhaust duct 40 at, upstream, or downstream of the one or more catalyst units 30 (e.g., CO catalyst unit 32 and SCR catalyst unit 34) and the one or more reductant injection units 36 (e.g., SCR unit 38). For example, the sensor grid 192 may include one or more of the sensor grids 130, 132, 134, and 136 as discussed above with reference to FIG. 1. The sensors 196 may include any number and arrangement of sensors, such as the illustrated sensors numbered 1 through 36. However, in certain embodiments, the sensor grid 192 may include 10 to 1000 sensors 196 in the plane 194.

As discussed above and in further detail below, the control system 22 is configured to monitor temperature feedback from the sensor grid 192, calculate an average temperature and a maximum temperature based on the temperature feedback, compare the average temperature and the maximum temperature against target values based at least in part on an error between a computer model and the sensor grid 192, adjust the error and target values based on any failed sensors 196 assuming a worst case scenario, and control the tempering air injection system 24 to maintain the target values. In particular, each failed sensor 196 in the sensor grid 192 is assumed to be a worst case scenario (e.g., most important sensor, hottest area, etc.) for purposes of adjusting the error and the target values using the computer model, thereby providing a conservative approach for controlling the tempering air injection system 24. As appreciated, the importance of each sensor 196 in the sensor grid 192 may depend on the temperature map 190 and the particular configuration of the sensors 196 in the sensor grid 192.

The temperature map 190 depicts a plurality of temperature contour lines 198, wherein each temperature contour line 198 represents a constant temperature, and the temperature map 190 depicts temperature changes (e.g., different temperature levels or magnitudes) from one temperature contour line 198 to another according to a temperature line legend 200. The temperature contour lines 198 have different appearances (e.g., thickness and line style, such as solid or dashed line styles). The temperature line legend 200 depicts reference lines 202 for the temperature map 190, wherein the temperature generally increases as indicated by arrow 204. In the illustrated embodiment, the temperature contour lines 198 can be solid or dashed; the thicker contour lines generally denote higher levels of temperature, while the thinner contour lines generally denote lower levels of temperature. Alternatively, in some embodiments, the temperature map 190 may include one or more continuous or discrete colors to denote the one or more levels of temperature, where the one or more colors may be interpreted with a palette-like temperature bar. In some embodiments, the temperature map 190 may use any suitable visual representations to visualize the temperature profile of the exhaust gas 66.

The temperature map 190 and the sensor grid 192 may be described with reference to a Cartesian coordinate system or legend 206 having a first axis 208 (e.g., horizontal or X-axis), a second axis 210 (e.g., vertical or Y-axis), and a third axis 212 (e.g., axial or Z-axis). The first and second axes 208 and 210 define the plane 194 of the temperature map 190 and the sensor grid 192, whereas the third axis 212 extends lengthwise along the exhaust duct 40 in a flow direction of exhaust gas 66.

Figure 3:
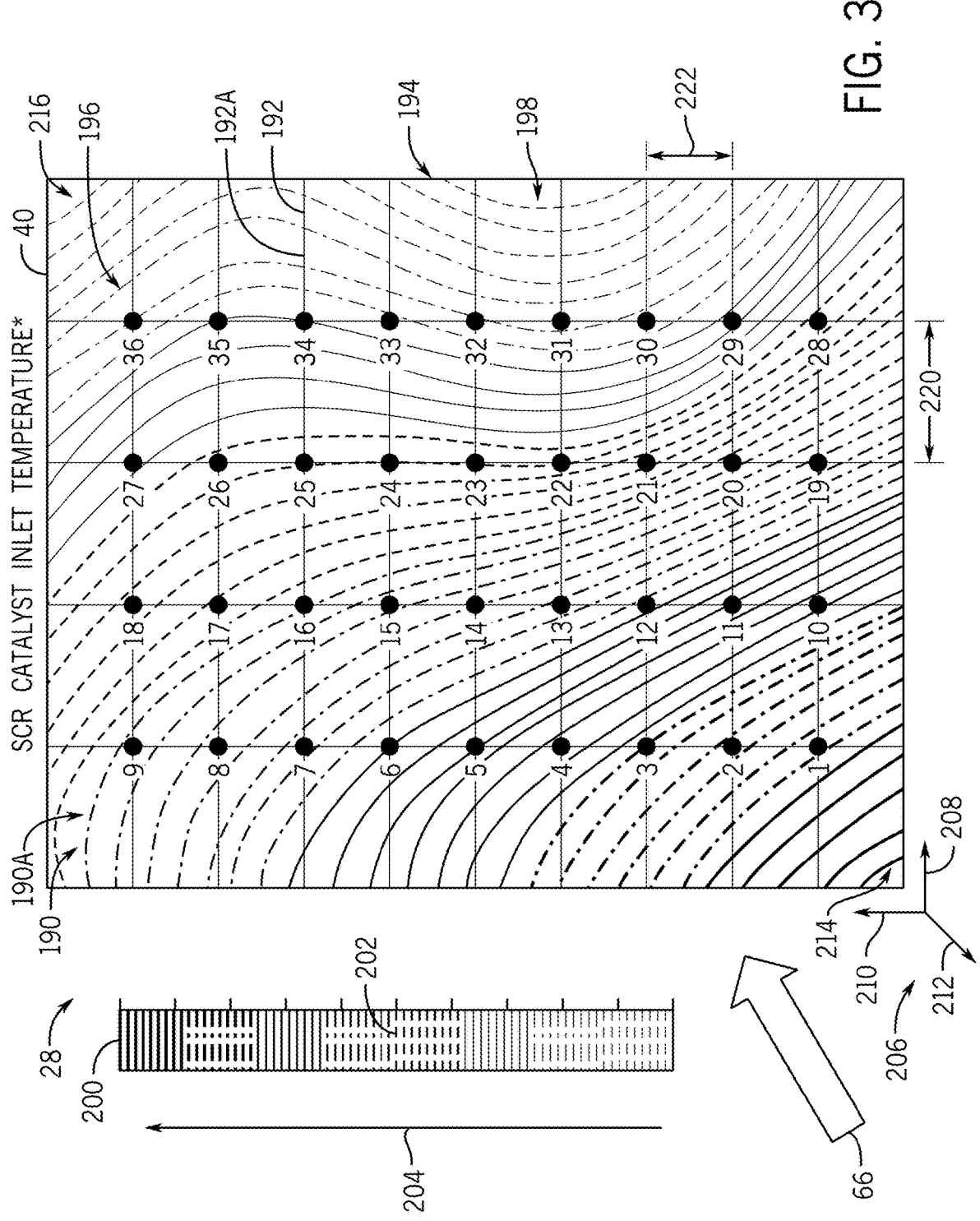
FIG. 3 is a schematic diagram of an embodiment of a sensor grid system disposed in the exhaust duct of the exhaust system of FIGS. 1 and 2, illustrating a uniform spacing of sensors and a first temperature map.
Figure 4:
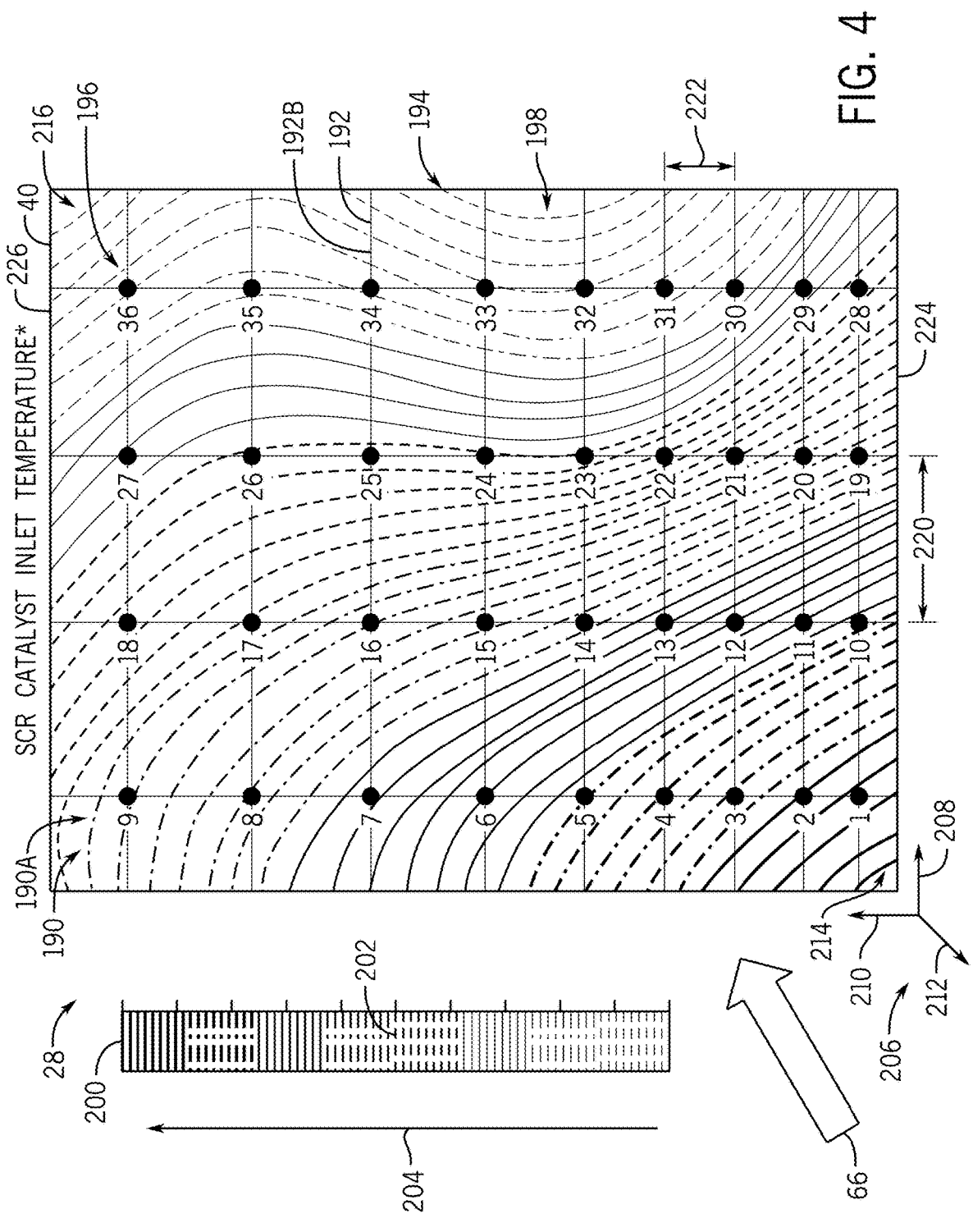
FIG. 4 is a schematic diagram of an embodiment of a sensor grid system disposed in the exhaust duct of the exhaust system of FIGS. 1 and 2, illustrating a variable spacing of sensors and the first temperature map.
Figure 5:
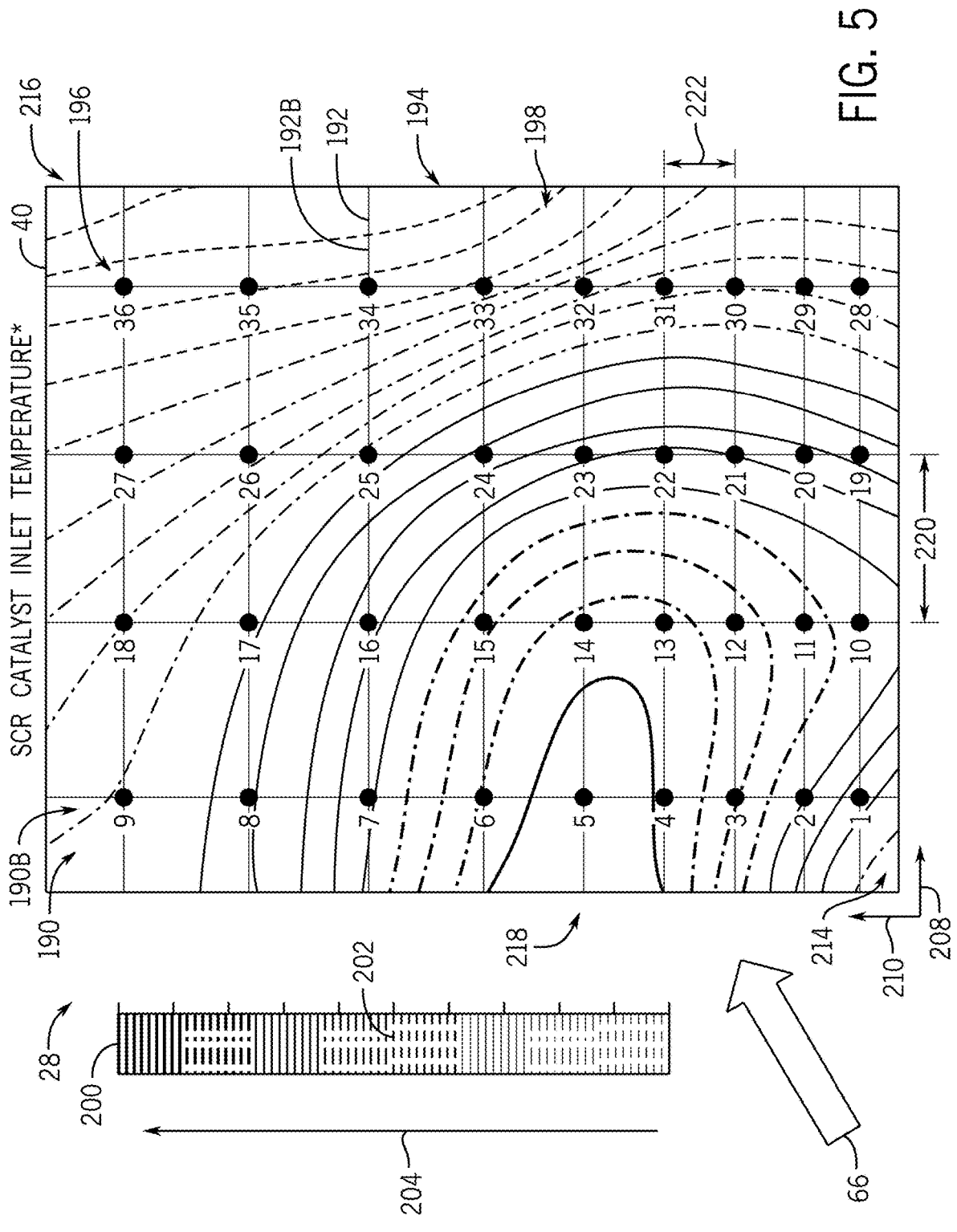
FIG. 5 is a schematic diagram of an embodiment of a sensor grid system disposed in the exhaust duct of the exhaust system of FIGS. 1 and 2, illustrating a variable spacing of sensors and a second temperature map.
Figure 6:
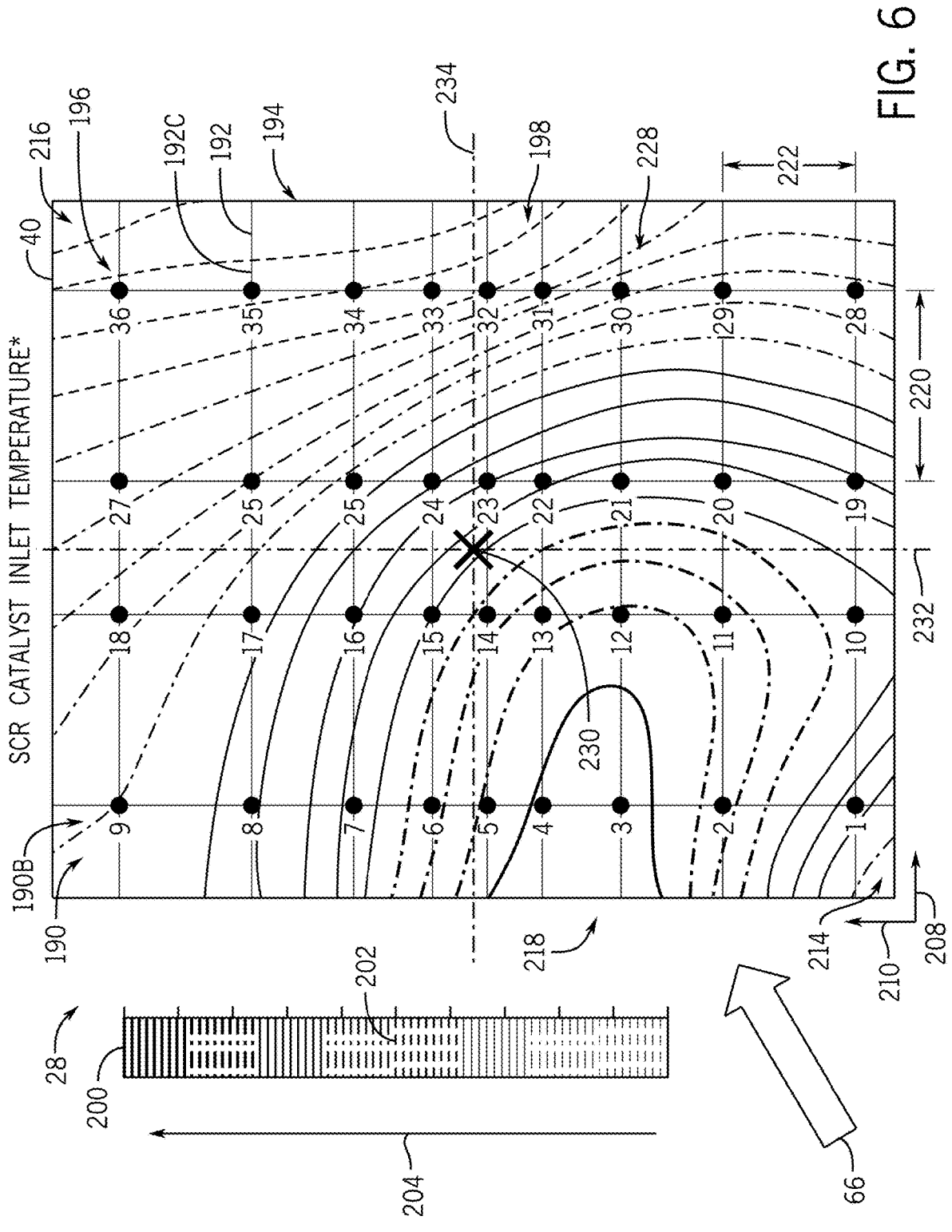
FIG. 6 is a schematic diagram of an embodiment of a sensor grid system disposed in the exhaust duct of the exhaust system of FIGS. 1 and 2, illustrating a variable spacing of sensors and the second temperature map.
Figure 7:
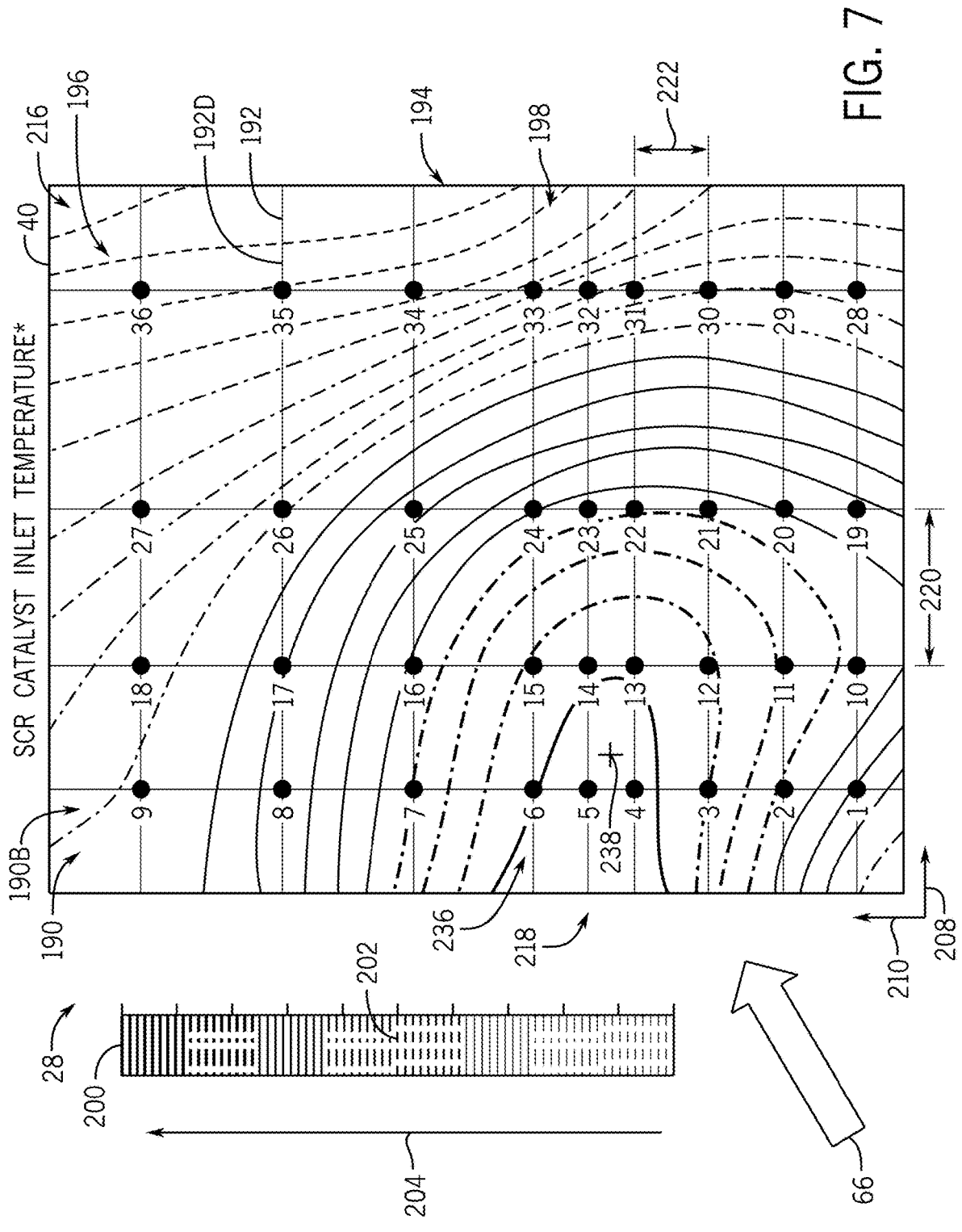
FIG. 7 is a schematic diagram of an embodiment of a sensor grid system disposed in the exhaust duct of the exhaust system of FIGS. 1 and 2, illustrating a variable spacing of sensors and the second temperature map.

FIGS. 3 and 4 illustrate an embodiment of the temperature map 190 (e.g., temperature map 190A) having a hot spot in a lower left region 214, wherein the temperature gradually increases from a left or upper left region 216 toward the lower left region 214. In contrast, FIGS. 5, 6, and 7 illustrate an embodiment of the temperature map 190 (e.g., temperature map 190B) having a hot spot in a middle left region 218, wherein the temperature gradually increases from the left or upper left region 216 toward the middle left region 218. Thus, the hot spots may vary in spatial locations within the plane 194 depending on a location in the exhaust duct 40, operating conditions of the gas turbine system 10, operating conditions of the tempering air injection system 24, operating conditions of the gas treatment system 20, ambient conditions, or any combination thereof. As a result, the worst case scenario for a sensor failure of one or more sensors 196 in the sensor grid 192 may vary due to variations in the temperature maps 190 (e.g., temperature maps 190A and 190B). However, for any particular temperature map 190, the control system 22 can identify the hot spots and most important sensors 196 for measuring the highest temperatures according to the temperature map 190, such that the control system 22 adjusts the error and target values based on any failed sensors 196 assuming the worst case scenario.

In certain embodiments, the sensor grid 192 may have a uniform sensor distribution and/or a variable or non-uniform sensor distribution relative to the first and second axes 208 and 210 in the plane 194. In some embodiments, the sensor grid 192 may be spaced the same regardless of variations in the temperature maps 190 (e.g., temperature maps 190A and 190B), or the sensor grid 192 may be spaced in a customized spacing for the temperature maps 190 (e.g., temperature maps 190A and 190B).

FIGS. 3-7 illustrate embodiments of the sensor grid 192 with different distributions of the sensors 196, wherein the sensors 196 have a first spacing 220 along the first axis 208 and a second spacing 222 along the second axis 210. In certain embodiments, the first spacing 220 may be uniform or equal between the sensors 196 spaced along the first axis 208 as illustrated in FIGS. 3-5, or the first spacing 220 may be non-uniform or variable between the sensors 196 spaced along the first axis 208 as illustrated in FIGS. 6-7. Similarly, in certain embodiments, the second spacing 222 may be uniform or equal between the sensors 196 spaced along the second axis 210 as illustrated in FIG. 3, or the second spacing 222 may be non-uniform or variable between the sensors 196 spaced along the second axis 210 as illustrated in FIGS. 4-7. In some embodiments, the first and second spacings 220 and 222 may be equal to one another, such that the entire sensor grid 192 has a uniform spacing or distribution of sensors 196. The various distributions of sensors 196 are discussed in further detail below with reference to FIGS. 3-7.

FIG. 3 illustrates an embodiment of the sensor grid 192 (e.g., sensor grid 192A) having a uniform distribution of the sensors 196, wherein the first spacing 220 is uniform or equal between the sensors 196 along the first axis 208 and the second spacing 222 is uniform or equal between the sensors 196 along the second axis 210. In the illustrated embodiment, the first spacing 220 is greater than the second spacing 222. However, in some embodiments, the first spacing 220 is less than the second spacing 222, or the first and second spacings 220 and 222 are equal to one another. The sensor grid 192 (e.g., 192A) may be used with any of the temperature maps 190 (e.g., 190A and 190B). In particular, the uniformity of the first spacing 220 and the uniformity of the second spacing 222 does not increase the density of sensors 196 (e.g., reduce spacings) for any particularly important areas, such as hot spots. In contrast, certain embodiments of the sensor grid 192 may be tailored to the temperature maps 190 (e.g., 190A and 190B), the geometry of the exhaust duct 40, the flow of exhaust gas 66, the spatial orientation or positioning of the one or more catalyst units 30 (e.g., CO catalyst unit 32 and SCR catalyst unit 34) and the one or more reductant injection units 36 (e.g., SCR unit 38), or any combination thereof.

FIG. 4 illustrates an embodiment of the sensor grid 192 (e.g., sensor grid 192B) having a variable distribution of the sensors 196, wherein the first spacing 220 is uniform or equal between the sensors 196 along the first axis 208 and the second spacing 222 is non-uniform or variable between the sensors 196 along the second axis 210. In the illustrated embodiment, the second spacing 222 gradually increases along the second axis 210 from a bottom side 224 toward a top side 226 of the exhaust duct 40. Thus, the second spacing 222 between the sensors 196 is generally smaller or denser toward the bottom side 224, including the hot spot in the temperature map 190, 190A in the lower left region 214. As a result of the dense spacing in the lower left region 214, the sensor grid 192B may have improved accuracy and/or redundancy in the hot spot of the temperature map 190, 190A. The control system 22 may account for this dense spacing of the sensors 196 in the hot spot when calculating the error and target values for the average temperature and the maximum temperature.

FIG. 5 illustrates an embodiment of the sensor grid 192 (e.g., sensor grid 192B) of FIG. 4 in context of the temperature map 190 (e.g., 190B). The sensor grid 192B is substantially the same as discussed above with reference to FIG. 4. However, the temperature map 190B of FIG. 5 differs from the temperature map 190A of FIG. 4, because the hot spot is shifted from the lower left region 214 to the middle left region 218. In certain embodiments, the temperature maps 190 (e.g., 190A and 190B) and the location of hot spots (e.g., 214 and 218) may change due to changing operational parameters of the gas turbine system 10 (e.g., during startup, steady state, part load, full load, evaporative cooler operation, etc.), changing operational parameters of the tempering air injection system 24 (e.g., flow rates, on or off states of fans, etc.), ambient temperature, or any combination thereof. Accordingly, as illustrated in FIG. 5, the second spacing 222 of the sensors 196 is lowest in the lower left region 214, rather than in the middle left region 218 having the hot spot. Thus, the sensor grid 192B may not be as accurate for the temperature map 190B in FIG. 5, when compared against using the sensor grid 192B for the temperature map 190A in FIG. 4. The control system 22 may account for this spacing of the sensors 196 (e.g., dense spacing offset from the hot spot) when calculating the error and target values for the average temperature and the maximum temperature.

FIG. 6 illustrates an embodiment of the sensor grid 192 (e.g., sensor grid 192C) having a variable distribution of the sensors 196 with the temperature map 190 (e.g., 190B), wherein the first spacing 220 is non-uniform or variable between the sensors 196 along the first axis 208 and the second spacing 222 is non-uniform or variable between the sensors 196 along the second axis 210. In the illustrated embodiment, the sensor grid 192C has a centrally biased distribution 228 of sensors 196, wherein the sensors 196 are most densely distributed (smallest spacings 220 and 222) at a center 230 of the exhaust duct 40 at an intersection of a vertical axis 232 centered along the first axis 208 and a horizontal axis 234 centered along the second axis 210. As illustrated, the first spacing 220 is lowest at the vertical axis 232 (e.g., centered about the vertical axis 232), wherein the first spacing 220 gradually increases in opposite directions away from the vertical axis 232 along the first axis 208. Similarly, the second spacing 222 is lowest at the horizontal axis 234 (e.g., centered about the horizontal axis 234), wherein the second spacing 222 gradually increases in opposite directions away from the horizontal axis 234 along the second axis 210.

Thus, in the illustrated embodiment, the centrally biased distribution 228 of the sensors 196 increases accuracy and/or redundancy toward the center 230 of the exhaust duct 40. The centrally biased distribution 228 may be helpful when central temperatures are important for controlling the temperature map in the exhaust duct 40 and/or when hot spots are at least near the center 230 of the exhaust duct 40. In the illustrated embodiment, the middle left region 218 has a hot spot relatively close to the center 230 of the exhaust duct 40. Accordingly, the sensor grid 192 (e.g., sensor grid 192C) of FIG. 6 may be advantageous in combination with embodiments of the control system 22, wherein fewer sensors 196 may be used in combination with corrections to account for any sensor failures.

FIG. 7 illustrates an embodiment of the sensor grid 192 (e.g., sensor grid 192D) having a variable distribution of the sensors 196 with the temperature map 190 (e.g., 190B), wherein the first spacing 220 is non-uniform or variable between the sensors 196 along the first axis 208 and the second spacing 222 is non-uniform or variable between the sensors 196 along the second axis 210. In the illustrated embodiment, the sensor grid 192D has a thermally biased distribution 236 of sensors 196, wherein the sensors 196 are most densely distributed (smallest spacings 220 and 222) at a center 238 of the hot spot in the middle left region 218. As illustrated, the first spacing 220 is lowest at the center 238 of the hot spot, wherein the first spacing 220 gradually increases in opposite directions away from the center 238 of the hot spot along the first axis 208. Similarly, the second spacing 222 is lowest at the center 238 of the hot spot, wherein the second spacing 222 gradually increases in opposite directions away from the center 238 of the hot spot along the second axis 210. Thus, in the illustrated embodiment, the thermally biased distribution 236 of the sensors 196 increases accuracy and/or redundancy toward the center 238 of the hot spot. The thermally biased distribution 236 may be helpful when hot spots are important for controlling the temperature map in the exhaust duct 40. Accordingly, the sensor grid 192 (e.g., sensor grid 192D) of FIG. 7 may be advantageous in combination with embodiments of the control system 22, wherein fewer sensors 196 may be used in combination with corrections to account for any sensor failures.

Referring now generally to FIGS. 1-7, the sensor feedback obtained at the various positions by the sensors 196 together forms of a discrete, measured temperature profile of the exhaust gas 66 across the sensor grid 192. In some embodiments, the sensor feedback of temperature may be further processed to calculate measured temperature characteristics (e.g., a measured average temperature, a measured maximum temperature, a measured minimum temperature, a measured temperature variance). The calculated temperature profile characteristics (e.g., a measured average temperature, a measured maximum temperature, a measured minimum temperature, a measured temperature variance) of the exhaust gas 66 may be analyzed to determine an amount of a tempering air to be injected into the exhaust gas 66.

If a sensor failure occurs, a reduced number of sensors 196 may be obtaining the sensor feedback of the temperature of the exhaust gas 66. The measured temperature characteristics may be calculated using only sensor feedback of temperature obtained from the remaining sensors 196. If the failed sensor is located at a most critical sensor position, such as a hottest sensor spot, certain measured temperature characteristics, such as the measured average temperature and the measured maximum temperature, may be lower than what it would be had there been no sensor failure. Thus, a thermal control system may be configured to compensate for any failed sensors 196. Specifically, the control system 22 may be configured compensate for each failed sensor 196 by assuming a worst case scenario (e.g., most critical sensor position or operating point), regardless of the actual sensor position of the failed sensor in the sensor grid 192.

As such, each sensor position may be described by a respective set of three coordinates, where the first coordinate along the first axis 208 and the second coordinate along the second axis 210 indicate a position of each sensor 196 on the sensor grid 192, and the third coordinate along the third axis 212 indicates a location of the sensor grid 192 in the exhaust duct 40. The sets of coordinates denoting the sensor positions may be used to generate simulated temperatures of the plurality of sensors 196 predicted with computer models. As previously discussed in reference to FIG. 1, the gas turbine system 10 may include one or more computer models (e.g., CFD analysis), where the computer models may simulate an operation of the gas turbine system 10. As such, the computer models may determine flow characteristics of fluid flows (e.g., the exhaust gas 66, the tempering air, the reductant) therein, where the flow characteristics of the fluid flows may include the respective flow rates, pressure values, temperature values, or a combination thereof. In some embodiments, the computer models may provide simulated temperatures of the exhaust gas 66 throughout the exhaust duct 40.

More specifically, the computer models may generate a continuous, simulated temperature profile of the exhaust gas 66 across the sensor grid 192 (e.g., the sensor grid 192 or 196). With the sets of coordinates denoting the sensor positions, the simulated temperatures of the plurality of sensors 196 may be extracted from the computer models. In some embodiments, the simulated temperatures may be further processed to calculate simulated temperature characteristics (e.g., a simulated average temperature, a simulated maximum temperature, a simulated minimum temperature, a simulated temperature variance). Then, the simulated temperature may be compared to the temperature feedback from the sensors 196 to establish an error and obtain setpoints for the thermal control system (e.g., the thermal control system 18 in FIG. 1) or, more specifically, a sensor grid control (e.g., the sensor grid control system 144 in FIG. 1) of the control system 22. In some embodiments, the error may be a difference between the computer models and the temperature feedback for an average temperature, a maximum temperature, or any other temperature characteristics of the plurality of sensors 196.

In some embodiments, the continuous, simulated temperature profile may be visualized as a temperature map, such as the temperature maps 190 as illustrated in FIGS. 3-7.

The continuous, simulated temperature profile may be used to identify the worst case sensor position corresponding to a worst case scenario of sensor failure. As discussed previously in reference to FIG. 1, if a sensor failure occurs in the plurality of sensors 196, the error and the setpoints may be updated based on a worst case scenario of the sensor failure. For example, in view of FIGS. 3 and 4, the sensor 1, among the plurality of sensors 196, is simulated to be positioned at a hottest spot across the exhaust duct 40; in other words, the loss of sensor 1 is considered to be a worst case scenario of the sensor failure based on the computer models. Accordingly, if a sensor 196 (e.g., any sensor of sensors 1 through 36) failure occurs, the error and the setpoints for the thermal control system 18, or, more specifically, the sensor grid control system 144 will be updated assuming the sensor 1 has failed.

As a more specific example, the error may be updated to be a difference between a measured average temperature of the operating sensors 196 and a simulated average temperature of the plurality of sensor except for the sensor 1, which is simulated to be positioned at a hottest spot across the exhaust duct 40. As such, the thermal control system 18, or, more specifically, the sensor grid control 144 of the control system 22 may over-compensate intentionally for the loss of the failed sensor, regardless of whether the failed sensor 196 may in fact be the sensor 196 corresponding to the worst case scenario of the sensor failure (e.g., sensor 1).

In some embodiments, the sensors 196 may be single-element thermocouples, where each sensor includes a single sensor element to obtain sensor feedback of temperature of the exhaust gas 66. In such embodiments, the worst case sensor position is in a hottest spot based on the continuous, simulated temperature profile across the sensor grid 192. In other embodiments, the sensors 196 may be dual- or multi-element thermocouples, where each sensor 196 includes a plurality of sensor elements to obtain redundant sensor feedback of temperature. In such embodiments, the worst case scenario of the sensor failure accounts for sensor failures of one or more of the plurality of sensor elements. If additional sensors 196 fail, then the thermal control system 18, or, more specifically, the sensor grid control 144 of the control system 22 would assume the next worst case scenario for each successive sensor failure, and establish a new error and new setpoints with the assumed next worst case scenario.

For example, in view of FIGS. 3 and 4 if two sensors 196 (e.g., any two sensors 196 of sensors 1 through 36) fail, the error and the setpoints for the thermal control system 18, or, more specifically, the sensor grid control 144 of the control system 22 will be updated assuming the two worse case scenario sensors 196 have failed, as sensors 1 and 2 are simulated to be positioned at the top two hottest spots across the exhaust duct 40. However, it should be noted that as the thermal control system 18, or, more specifically, the sensor grid control 144 of the control system 22 controls the temperature of the exhaust gas 66, the temperature profile may be constantly updated. Hence, the sensor position corresponding to a worst case scenario of sensor failure may be updated in accordance with the updated temperature profile.

It may be observed that depending on the arrangement of the plurality of sensors 196, the criticality of the sensors 196 may be ranked differently. For example, the five most critical sensors 196 in the sensor grid 192 of FIG. 3 are, in order of criticality, the sensor 1, the sensor 2, the sensor 3, the sensor 10, and the sensor 4, while the five most critical sensors 196 in the sensor grid 196 of FIG. 4 are the sensor 1, the sensor 2, the sensor 3, the sensor 4, and the sensor 5. As previously discussed, the sensor grids 192A and 192B are arranged differently, where the sensor grid 192A has a uniform spacing of a plurality of sensors 196 along the first and second axes 208, 210, while the sensor grid 192B has a variable spacing of the plurality of sensors 196 along the second axis 210. In some embodiments, the sensors 196 may be strategically arranged to reduce the potential effect of sensor failure. For example, the sensors 196 may be spaced more closely together in areas of particular interest (e.g., expected hot spots, central areas, etc.). For example, as discussed above, FIG. 6 illustrates centrally biased distribution 228 of sensors 196, and FIG. 7 illustrates a thermally biased distribution 236 of sensors 196. In some embodiments, the sensors 196 may be evenly distributed, biased toward one or more sides, biased toward one or more central axis, biased toward one or more hot spots, or arranged in any suitable configurations.

In some embodiments, the sensor arrangement may be optimized to minimize the effect of sensor failures. In some embodiment, a history of the sensor feedback of temperature of an exhaust gas 66 or a history of the simulated temperature profile may be analyzed to identify areas of particular interest. For example, a history of the simulated temperature profile may be analyzed by a computer model to identify areas with the highest probability of having a temperature exceeding a maximum temperature threshold. In the illustrated embodiment in FIG. 7, the middle left region 218 (e.g., an area of interest) is identified to be hotter than the other areas within the exhaust duct 40. Accordingly, the sensors 196 in the sensor grid 192 (e.g., 192D) are biased toward the area of interest (e.g., at the center 238 of the hot spot). In such embodiments, if a sensor fails near the area of interest, increased uncertainty of the measured temperature characteristics due to the sensor failure may be reduced compared to that of other embodiments, where the sensor feedback of temperature is obtained via sensor grids that are not optimized.

Figure 8:
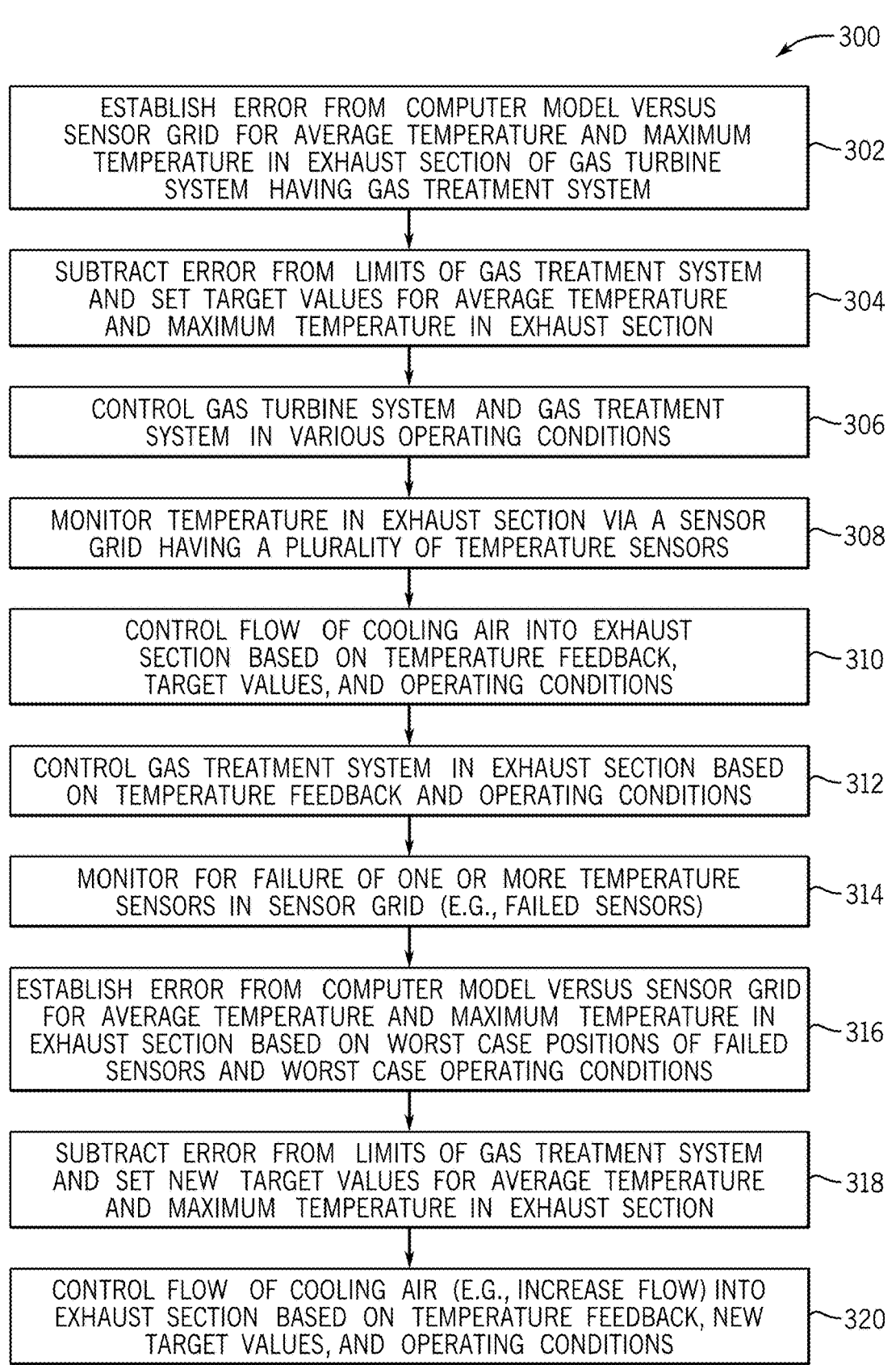
FIG. 8 is a process flow diagram of an embodiment of a method of controlling temperatures in the exhaust system of FIGS. 1-7 by compensating for one or more failed sensors in a sensor grid system.

With the foregoing in mind, FIG. 8 is a process flow diagram illustrating a method 300 by which the thermal control system 18 may control temperatures in the exhaust system 16. The thermal control system 18 may include the tempering air control 142 and the sensor grid control 144, where the tempering air control 142 and the sensor grid control 144 may cooperatively control a flow of tempering air that may be injected to the exhaust system 16 through the tempering air injection system 24. Specifically, the thermal control system 18 may adjust the flow of tempering air by compensating for any failed sensors in the sensor grid system 28. As such, the gas turbine system 10 may protect the gas treatment system 20 from overheating and continue its operation without interruptions due to sensor failures, in accordance with an embodiment of the present disclosure.

In the illustrated embodiment, the method 300 includes establishing (block 302) an error between a computer model (e.g., CFD analysis) and a sensor grid (e.g., sensor grid 130, 132, 134, 136, 192) for an average temperature and a maximum temperature in an exhaust section (e.g., the exhaust system 16) of the gas turbine system 10 having the gas treatment system 20. In other words, the error may be a difference between a simulated temperature characteristic determined from simulated temperatures of the computer model and a measured temperature characteristic determined from measured temperatures obtained from the sensor grid.

The method 300 includes subtracting (block 304) the established error from limits of the gas treatment system 20 and setting target values of the thermal control system 18 in the exhaust section. In some embodiments, the limits of the gas treatment system 20 may be operational limits of the gas treatment system and its components set by a manufacturer of the system. In other embodiments, the limits of the gas treatment system 20 may be empirical operational limits determined from historical operational data of the gas treatment system. The target values may include a target average temperature, a target maximum temperature, or both in the exhaust section. In some embodiments, the target values may be determined based on the limits of the gas treatment system 20. For example, the target maximum temperature in the exhaust section may be a fraction of an operating limit of a component of the gas treatment system 20, such as a SCR catalyst unit 34.

The method 300 includes controlling (block 306) the gas turbine system 10 and the gas treatment system 20 in various operating conditions. The operating conditions may include an ambient temperature, an exhaust inlet temperature, conditions of various instruments in the system such as the temperature sensors 196, current status of controlled devices such as speeds of fans 100 or positions of guide vanes or dampers in the tempering air injection system 24, any other operating conditions indicative of a status of an aspect of the gas turbine system 10, or any suitable combination thereof.

The method 300 includes monitoring (block 308) temperatures in the exhaust section via one or more temperature sensors 196 to provide temperature feedback indicative of the temperatures at one or more respective sensor positions, where the one or more temperature sensors 196 are disposed in the sensor grid 192. In some embodiments, the temperature feedback may be stored in a memory 148 of the control system 22 of the gas turbine system 10.

The method 300 includes controlling (block 310) a flow of tempering air 102 into the exhaust section based on the temperature feedback, the target values, and the operating conditions. The thermal control system 18 may vary (e.g., increase or decrease) a flow rate of the tempering air 102 by controlling the controlled devices in the tempering air injection system 24. For example, the thermal control system 18 may reestablish the speed of the fans 100 or the positions of guide vanes or dampers to control the flow of tempering air 102.

The method 300 includes controlling (block 312) the gas treatment system 20 in the exhaust section based on the temperature feedback and the operating conditions. The thermal control system 18 may vary (e.g., increase or decrease) a flow rate of a reductant (e.g., ammonia) by controlling controlled devices in a reductant injection system (e.g., the reductant injection units 36). For example, the thermal control system may control a valve 116 configured to control a flow of the reductant to an evaporator (e.g., the evaporator 112) of the reductant injection system 36.

The method 300 includes monitoring (block 314) for failure of the one or more temperature sensors 196 (e.g., failed sensors) in the sensor grid 192. In some embodiments, the thermal control system 18 may be configured to determine a sensor failure of the one or more temperature sensors 196 through any suitable method. For example, the thermal control system 18 may analyze a history of sensor readings associated with a sensor or other suitable sensors and determine if the sensor failed by comparing a sensor reading with the history of sensor readings. In some embodiments, new temperature feedback may be obtained from the remaining sensors 196. In some embodiments, the operating conditions may be updated in the thermal control system 18 to new operating conditions indicative of the failed temperature sensors.

The method 300 includes reestablishing (block 316) the error from the computer model versus the sensor grid 192 for the average temperature, the maximum temperature, or both in exhaust section based on worst case positions of failed sensors and/or worst case operating conditions, regardless of the actual sensor position of the failed sensors in the sensor grids 192. In some embodiments, the worst case positions of failed sensors may correspond to a hottest sensor position.

The method 300 includes subtracting (block 318) the error from the limits of the gas treatment system 20 and set new target values of the thermal control system 18 in the exhaust section. The new target values may include a new target average temperature and a new target maximum temperature in the exhaust section.

The method 300 includes controlling (block 320) the flow of tempering air 102 (e.g., increase or decrease flow) into the exhaust section based on the new temperature feedback, the new target values, and the new operating conditions. The thermal control system 18 may vary (e.g., increase or decrease) the flow rate of the tempering air by controlling the controlled devices in the tempering air injection system 24. For example, the thermal control system 18 may reestablish the speed of the fans 100 or the positions of guide vanes or dampers to control the flow of tempering air 102.

In accordance with various embodiments described above, a gas turbine system 10, which includes a gas treatment system 20 that may have a temperature-sensitive component (or, specifically, a SCR catalyst unit 34), has a thermal control system 18 configured to continue its operations without interruptions due to sensor failures in the system 18. Further, the thermal control system 18 may function conservatively to protect the gas treatment system 20 from overheating and causing substantial damage to the gas turbine system 10. Thus, a technical effect of the disclosed embodiments includes improved control of the gas treatment system by improving the temperature control of the exhaust gas using tempering air, regardless of sensor failures. In particular, a technical effect of the disclosed embodiments adjusts target values for the average temperature and the maximum temperature by accounting for errors caused by sensor failures, regardless of the particular location or criticality of the sensor, by assuming a worst case scenario for each sensor failure. Thus, the use of worst case scenarios for sensor failures improves the control system, at least by simplifying the control system and improving overall efficiency of the control system. The control system also may enable a reduced set of sensors in the sensor grid, thereby reducing costs and improving the efficiency of the control system. Furthermore, the sensor grid may be tailored to a particular temperature map, such as by focusing the distribution of sensors in certain areas of interest (e.g., hot spots), thereby improving accuracy and redundancy of sensors in the areas of interest regardless of sensor failures.

The subject matter described in detail above may be defined by one or more clauses, as set forth below.

In certain embodiments, a system includes an exhaust duct; a gas treatment system coupled to the exhaust duct; a sensor grid having a plurality of sensors disposed in the exhaust duct; a tempering air injection system coupled to the exhaust duct upstream from the gas treatment system, wherein the tempering air injection system is configured to inject an air flow into an exhaust flow in the exhaust duct; and a controller having a memory, a processor, and instructions stored on the memory and executable by the processor to: obtain sensor feedback of temperature via the plurality of sensors in the sensor grid; if a sensor failure occurs in the plurality of sensors, then: establish an error between a computer model and the sensor grid for an average value and a maximum value of the temperature compensating for a worst case scenario of the sensor failure; and subtract the error from operating limits of the gas treatment system and set target average value and target maximum value of the temperature; and control the air flow from the tempering air injection system into the exhaust flow in the exhaust duct based on the target average value and the target maximum value of the temperature and temperature measurements from the sensor grid.

The system of the preceding clause, wherein the worst case scenario of the sensor failure includes a worst case sensor position.

The system of any preceding clause, wherein the worst case sensor position is in a hottest spot based on a temperature profile across the sensor grid.

The system of any preceding clause, wherein the controller includes instructions to, for each successive sensor failure in a total number of sensor failures in the plurality of sensors: establish the error between the computer model and the sensor grid for the average value and the maximum value of the temperature compensating for the worst case scenario of the total number of sensor failures; and subtract the error from operating limits of the gas treatment system and set the target average value and the target maximum value of the temperature.

The system of any preceding clause, wherein the worst case scenario of the total number of sensor failures includes worst case sensor positions of the total number of sensor failures.

The system of any preceding clause, wherein the worst case sensor positions are in one or more hottest spots based on a temperature profile across the sensor grid.

The system of any preceding clause, wherein the error is between predictions by the computer model and measurements by the sensor grid for the average value and the maximum value of the temperature; and wherein the operating limits include temperature limits of the gas treatment system.

The system of any preceding clause, wherein each sensor of the plurality of sensors includes a plurality of sensor elements to obtain redundant sensor feedback of temperature; and wherein the worst case scenario of the sensor failure accounts for sensor failures of one or more of the plurality of sensor elements.

The system of any preceding clause, wherein the controller includes instructions to, prior to the sensor failure: establish an initial error between the computer model and the sensor grid for the average value and the maximum value of the temperature; and subtract the initial error from the operating limits of the gas treatment system and set the target average value and the target maximum value of the temperature.

The system of any preceding clause, wherein the controller includes instructions to: calculate a measured average value and a measured maximum value of the temperature based on the sensor feedback; compare the measured average value against the target average value and compare the measured maximum value against the target maximum value to obtain comparisons; and control the air flow from the tempering air injection system into the exhaust flow in the exhaust duct based on comparisons.

The system of any preceding clause, wherein the gas treatment system includes a catalyst unit disposed in the exhaust duct.

The system of any preceding clause, wherein the catalyst unit includes a carbon monoxide (CO) catalyst, a selective catalytic reduction (SCR) catalyst, or a combination thereof.

The system of any preceding clause, wherein the gas treatment system includes a reductant injection unit disposed in the exhaust duct.

The system of any preceding clause, wherein the sensor grid is disposed upstream and/or downstream from the catalyst unit, the reductant injection unit, or a combination thereof.

The system of any preceding clause, comprising a gas turbine engine coupled to the exhaust duct.

In certain embodiments, a system includes a controller having a memory, a processor, and instructions stored on the memory and executable by the processor to: obtain sensor feedback of temperature via a plurality of sensors in a sensor grid disposed in an exhaust duct, wherein a gas treatment system is coupled to the exhaust duct, wherein a tempering air injection system is coupled to the exhaust duct upstream from the gas treatment system, and wherein the tempering air injection system is configured to inject an air flow into an exhaust flow in the exhaust duct; if a sensor failure occurs in the plurality of sensors, then: establish an error between a computer model and the sensor grid for an average value and a maximum value of the temperature compensating for a worst case scenario of the sensor failure; and subtract the error from operating limits of the gas treatment system and set target average value and target maximum value of the temperature; and control the air flow from the tempering air injection system into the exhaust flow in the exhaust duct based on the target average value and the target maximum value of the temperature and temperature measurements from the sensor grid.

The system of the preceding clause, comprising the sensor grid coupled to the controller.

The system of any preceding clause, wherein the controller includes instructions to, for each successive sensor failure in a total number of sensor failures in the plurality of sensors: establish the error between the computer model and the sensor grid for the average value and the maximum value of the temperature compensating for the worst case scenario of the total number of sensor failures; and subtract the error from operating limits of the gas treatment system and set the target average value and the target maximum value of the temperature.

In certain embodiments, a method includes obtaining sensor feedback of temperature via a plurality of sensors in a sensor grid disposed in an exhaust duct, wherein a gas treatment system is coupled to the exhaust duct, wherein a tempering air injection system is coupled to the exhaust duct upstream from the gas treatment system, and wherein the tempering air injection system is configured to inject an air flow into an exhaust flow in the exhaust duct; if a sensor failure occurs in the plurality of sensors, then: establishing an error between a computer model and the sensor grid for an average value and a maximum value of the temperature compensating for a worst case scenario of the sensor failure; and subtracting the error from operating limits of the gas treatment system and setting target average value and target maximum value of the temperature; and controlling the air flow from the tempering air injection system into the exhaust flow in the exhaust duct based on the target average value and the target maximum value of the temperature and temperature measurements from the sensor grid.

The method of the preceding clause, wherein, for each successive sensor failure in a total number of sensor failures in the plurality of sensors: establishing the error between the computer model and the sensor grid for the average value and the maximum value of the temperature compensating for the worst case scenario of the total number of sensor failures; and subtracting the error from operating limits of the gas treatment system and setting the target average value and the target maximum value of the temperature.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A method, comprising:

obtaining, via a controller, sensor feedback of temperature of an exhaust flow via a plurality of sensors of a sensor grid, wherein the controller comprises a memory, a processor, and instructions stored on the memory and executable by the processor;

determining, via the controller, that a sensor failure has occurred in the plurality of sensors, then:

establishing, via the controller, an error between a computer model and the sensor grid for an average value and a maximum value of the temperature, compensating for a worst case scenario of the sensor failure; and subtracting, via the controller, the error from operating limits of a gas treatment system and setting a target average value and a target maximum value of the temperature; and controlling, via the controller, an air flow into the exhaust flow based on the target average value and the target maximum value of the temperature and the sensor feedback of temperature from the sensor grid.

2. The method of claim 1, wherein, for each successive sensor failure in a total number of sensor failures in the plurality of sensors:

establishing, via the controller, the error between the computer model and the sensor grid for the average value and the maximum value of the temperature, compensating for the worst case scenario of the total number of sensor failures; and subtracting, via the controller, the error from operating limits of the gas treatment system and setting the target average value and the target maximum value of the temperature.

3. The method of claim 1, comprising controlling, via the controller, the air flow into the exhaust flow by controlling a fan, a damper, or a combination thereof, of a tempering air injection system, wherein the tempering air injection system is coupled to an exhaust duct and configured to inject the air flow into the exhaust flow in the exhaust duct.

4. A system, comprising:

a controller having a memory, a processor, and instructions stored on the memory and executable by the processor to:

obtain sensor feedback of temperature of an exhaust flow via a plurality of sensors of a sensor grid;

if a sensor failure occurs in the plurality of sensors, then:

establish an error between a computer model and the sensor grid for an average value and a maximum value of the temperature, compensating for a worst case scenario of the sensor failure; and subtract the error from operating limits of a gas treatment system and set a target average value and a target maximum value of the temperature; and control an air flow into the exhaust flow based on the target average value and the target maximum value of the temperature and the sensor feedback of temperature from the sensor grid.

5. The system of claim 4, further comprising at least one of:

the plurality of sensors of the sensor grid configured to couple to an exhaust duct and to the controller;

the gas treatment system configured to couple to the exhaust duct; or a tempering air injection system configured to couple to the exhaust duct, wherein the tempering air injection system comprises a fan, a damper, or a combination thereof.

6. The system of claim 4, wherein the controller comprises instructions to, for each successive sensor failure in a total number of sensor failures in the plurality of sensors:

establish the error between the computer model and the sensor grid for the average value and the maximum value of the temperature, compensating for the worst case scenario of the total number of sensor failures; and subtract the error from the operating limits of the gas treatment system and set the target average value and the target maximum value of the temperature.

7. A system, comprising:

an exhaust duct;

a gas treatment system coupled to the exhaust duct;

a sensor grid having a plurality of sensors disposed in the exhaust duct;

a tempering air injection system coupled to the exhaust duct upstream from the gas treatment system, wherein the tempering air injection system comprises a fan, a damper, or a combination thereof, wherein the tempering air injection system is configured to inject an air flow into an exhaust flow in the exhaust duct; and a controller having a memory, a processor, and instructions stored on the memory and executable by the processor to:

obtain sensor feedback of temperature via the plurality of sensors in the sensor grid;

if a sensor failure occurs in the plurality of sensors, then:

establish an error between a computer model and the sensor grid for an average value and a maximum value of the temperature, compensating for a worst case scenario of the sensor failure; and subtract the error from operating limits of the gas treatment system and set a target average value and a target maximum value of the temperature; and control the air flow from the tempering air injection system into the exhaust flow in the exhaust duct based on the target average value and the target maximum value of the temperature and the sensor feedback of temperature from the sensor grid.

8. The system of claim 7, wherein the worst case scenario of the sensor failure comprises a worst case sensor position.

9. The system of claim 8, wherein the worst case sensor position is in a hottest spot based on a temperature profile across the sensor grid.

10. The system of claim 7, wherein the controller comprises instructions to, for each successive sensor failure in a total number of sensor failures in the plurality of sensors:

establish the error between the computer model and the sensor grid for the average value and the maximum value of the temperature compensating for the worst case scenario of the total number of sensor failures; and subtract the error from the operating limits of the gas treatment system and set the target average value and the target maximum value of the temperature.

11. The system of claim 10, wherein the worst case scenario of the total number of sensor failures comprises worst case sensor positions of the total number of sensor failures.

12. The system of claim 11, wherein the worst case sensor positions are in one or more hottest spots based on a temperature profile across the sensor grid.

13. The system of claim 7, wherein the error is between predictions by the computer model and measurements by the sensor grid for the average value and the maximum value of the temperature; and wherein the operating limits comprise temperature limits of the gas treatment system.

14. The system of claim 7, wherein each sensor of the plurality of sensors comprises a plurality of sensor elements to obtain redundant sensor feedback of temperature; and wherein the worst case scenario of the sensor failure accounts for sensor failures of one or more of the plurality of sensor elements.

15. The system of claim 7, wherein the controller comprises instructions to, prior to the sensor failure:

establish an initial error between the computer model and the sensor grid for the average value and the maximum value of the temperature; and subtract the initial error from the operating limits of the gas treatment system and set the target average value and the target maximum value of the temperature.

16. The system of claim 7, wherein the controller comprises instructions to:

calculate a measured average value and a measured maximum value of the temperature based on the sensor feedback;

compare the measured average value against the target average value and compare the measured maximum value against the target maximum value to obtain comparisons; and control the air flow from the tempering air injection system into the exhaust flow in the exhaust duct based on the comparisons.

17. The system of claim 7, wherein the gas treatment system comprises a catalyst unit disposed in the exhaust duct.

18. The system of claim 17, wherein the catalyst unit comprises a carbon monoxide (CO) catalyst, a selective catalytic reduction (SCR) catalyst, or a combination thereof.

19. The system of claim 17, wherein the gas treatment system comprises a reductant injection unit disposed in the exhaust duct, wherein the sensor grid is disposed upstream and/or downstream from the catalyst unit, the reductant injection unit, or a combination thereof.

20. The system of claim 7, wherein the controller is configured to control the air flow from the tempering air injection system into the exhaust flow by controlling the fan, the damper, or both the fan and the damper.

21. The system of claim 7, comprising a gas turbine engine coupled to the exhaust duct.

* * * * *